(12) United States Patent
Adler et al.

(10) Patent No.: US 11,403,203 B2
(45) Date of Patent: Aug. 2, 2022

(54) UTILIZING APPLICATION PERFORMANCE MANAGEMENT AUTOMATIC DISCOVERY DATA FOR PLUGIN PRIORITY

(71) Applicant: Capital One Services, LLC, McLean, VA (US)

(72) Inventors: Keith Adler, Dallas, TX (US); Venkata Mandali, Glen Allen, VA (US); Arunkumar Natarajan, Glen Allen, VA (US); Kadhiresan Kanniyappan, Ashburn, VA (US); Fnu Ashish Kumar, Vinings, GA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 455 days.

(21) Appl. No.: 16/188,355

(22) Filed: Nov. 13, 2018

(65) Prior Publication Data

US 2020/0151080 A1    May 14, 2020

(51) Int. Cl.
*H04L 67/12* (2022.01)
*G06F 11/34* (2006.01)
(Continued)

(52) U.S. Cl.
CPC ...... *G06F 11/3476* (2013.01); *G06F 11/3419* (2013.01); *G06F 40/221* (2020.01); *G06N 20/00* (2019.01); *H04L 67/12* (2013.01)

(58) Field of Classification Search
CPC ............ G06F 11/3476; G06F 11/3495; G06F 11/3419; G06F 11/3409; G06F 11/3006; G06F 11/302; G06F 2201/87; G06F 2201/835; G06F 2201/81; G06F 9/44526; G06F 40/20; G06N 3/08; G06N 3/0454; G06N 5/043; G06N 5/02; G06N 20/00; H04L 67/12

See application file for complete search history.

(56) References Cited

PUBLICATIONS

Polishetty et al., A Next-Generation Secure Cloud-Based Deep Learning License Plate Recognition for Smart Cities, 2016, 15th IEEE International Conference on Machine Learning and Applications, pp. 286-294 (Year: 2016).*

(Continued)

*Primary Examiner* — Toan M Le
(74) *Attorney, Agent, or Firm* — Hunton Andrews Kurth LLP

(57) ABSTRACT

An exemplary system, method, and computer-accessible medium for classifying data associated with an application performance management ("APM") agent(s) deployed on a server(s), can include, for example, receiving first information related to data to be read by the APM agent(s) located at the server(s), generating second information by assigning a score to the first information using machine learning procedure(s), classifying the data based on the second information. A data plugin(s) associated with the data can be determined based on the classification. A determination can be made as to whether the data is labeled as a data type. The second information can be generated based on (i) a log(s) associated with the data, (ii) transaction data associated with the data, (iii) server metrics associated with the data, (iv) a time stamp(s) associated with the data, (v) infrastructure data associated with the data, (vi) domain knowledge, or (vii) environment knowledge.

20 Claims, 6 Drawing Sheets

(51) Int. Cl.
*G06N 20/00* (2019.01)
*G06F 40/221* (2020.01)

(56) References Cited

PUBLICATIONS

IEEE Xplore Search Results, Jan. 17, 2021, 1 pp. (Year: 2021).*
Zhao et al., Discovering Anomalies and Root Causes in Applications via Relevant Fields Analysis, 2015 IEEE 15th International Conference on Data Mining Workshops, pp. 1664-1667 (Year: 2015).*
IEEE Xplore Search Results, Jun. 11, 2021, 1 pp. (Year: 2021).*
Boutaba et al., A Comprehensive Survey on Machine Learning for Networking: Evolution, applications and Research Opportunities, Published: Jun. 21, 2018, Journal of Internet Services and Applications 9:16, 99 pp. (Year: 2018).*
Boutaba et al. Abstract, Jun. 21, 2018, 1 pp. (Year: 2018).*

* cited by examiner

UTILIZING APPLICATION PERFORMANCE MANAGEMENT AUTOMATIC DISCOVERY DATA FOR PLUGIN PRIORITY

FIELD OF THE DISCLOSURE

The present disclosure relates generally to application performance management ("APM"), and more specifically, to exemplary embodiments of an exemplary system, method, and computer-accessible medium for classifying data associated with an APM agent.

BACKGROUND INFORMATION

In information technology and systems management, APM is the monitoring and management of performance and availability of software applications. APM can be used to detect and diagnose complex application performance problems to maintain an expected level of service. In order to perform the analysis, APM uses various data intended for a server (e.g., a live server). This data can come from many different locations in a network and can be used in many different applications. Additionally, this data can be in many different forms (e.g., can be many different data types), all of which need to be read by the server. However, unless a server is manually configured upon receipt of each data type (e.g., especially new data types), it can be difficult to tell what type of data is received on a live server. For example, it can be difficult to determine what language (e.g., programming language) was used to generate the data. Without this information, much of the received data cannot be read or analyzed, or potentially only generic information about the data can be determined or used.

Thus, it may be beneficial to provide exemplary system, method, and computer-accessible medium for classifying data associated with an APM agent which can overcome at least some of the deficiencies described herein above.

SUMMARY OF EXEMPLARY EMBODIMENTS

An exemplary system, method, and computer-accessible medium for classifying data associated with an application performance management ("APM") agent(s) deployed on a server(s), can include, for example, receiving first information related to data to be read by the APM agent(s) located at the server(s), generating second information by assigning a score to the first information using a machine learning procedure(s), classifying the data based on the second information. A data plugin(s) associated with the data can be determined based on the classification. A determination can be made as to whether the data is labeled as a data type. The second information can be generated based on (i) a log(s) associated with the data, (ii) transaction data associated with the data, (iii) server metrics associated with the data, (iv) a time stamp(s) associated with the data, (v) infrastructure data associated with the data, (vi) domain knowledge, or (vii) environment knowledge.

In some exemplary embodiments of the present disclosure, the second information can be generated using a natural language processing procedure(s). The classification can include a relation to a programming language(s). The classification can also include no relation to a known programming language. The data can be classified as having no relation to the known programming language if the score is below a particular threshold. The data can be classified as a data type based on the second information. The data can be classified as a data type if the score is above a particular threshold. The score can be a probability. The first information can be stored in a collector prior to generating the second information. The data stored in the collector can be modified based on the classification. The server(s) can be a live server.

Further, an exemplary system, method, and computer-accessible medium for storing data associated with an application performance management ("APM") agent(s) deployed on server(s), receiving first information related to data to be read by the APM agent(s) located at the server(s), can include determining if the first information is associated with a known data type(s), generating second information by assigning a probability of a data type(s) to the first information if the first information is determined not to be the known data type(s), classifying the data based on the second information, and storing the data in a collector based on the classification. A plugin(s) can be assigned to the data based on the classification. The second information can be generated based on (i) a log(s) associated with the data, (ii) transaction data associated with the data, (iii) server metrics associated with the data, (iv) a time stamp(s) associated with the data, (v) infrastructure data associated with the data, (vi) domain knowledge, or (vii) environment knowledge.

Additionally, an exemplary system, method, and computer-accessible medium for storing data associated with an application performance management ("APM") agent(s) deployed on server(s), can include receiving first information related to data to be read by the APM agent(s) located at the server(s), determining if the first information is associated with a known data type(s), storing the data in a collector, generating second information by assigning a probability of a data type(s) to the first information if the first information is determined not to be the known data type(s), classifying the data based on the second information being above a particular threshold, and modifying the data stored in the collector based on the classification. The generating of the second information can include applying a machine learning procedure(s) to the first information. The machine learning procedure(s) can include a convolutional neural network(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Figure 1:
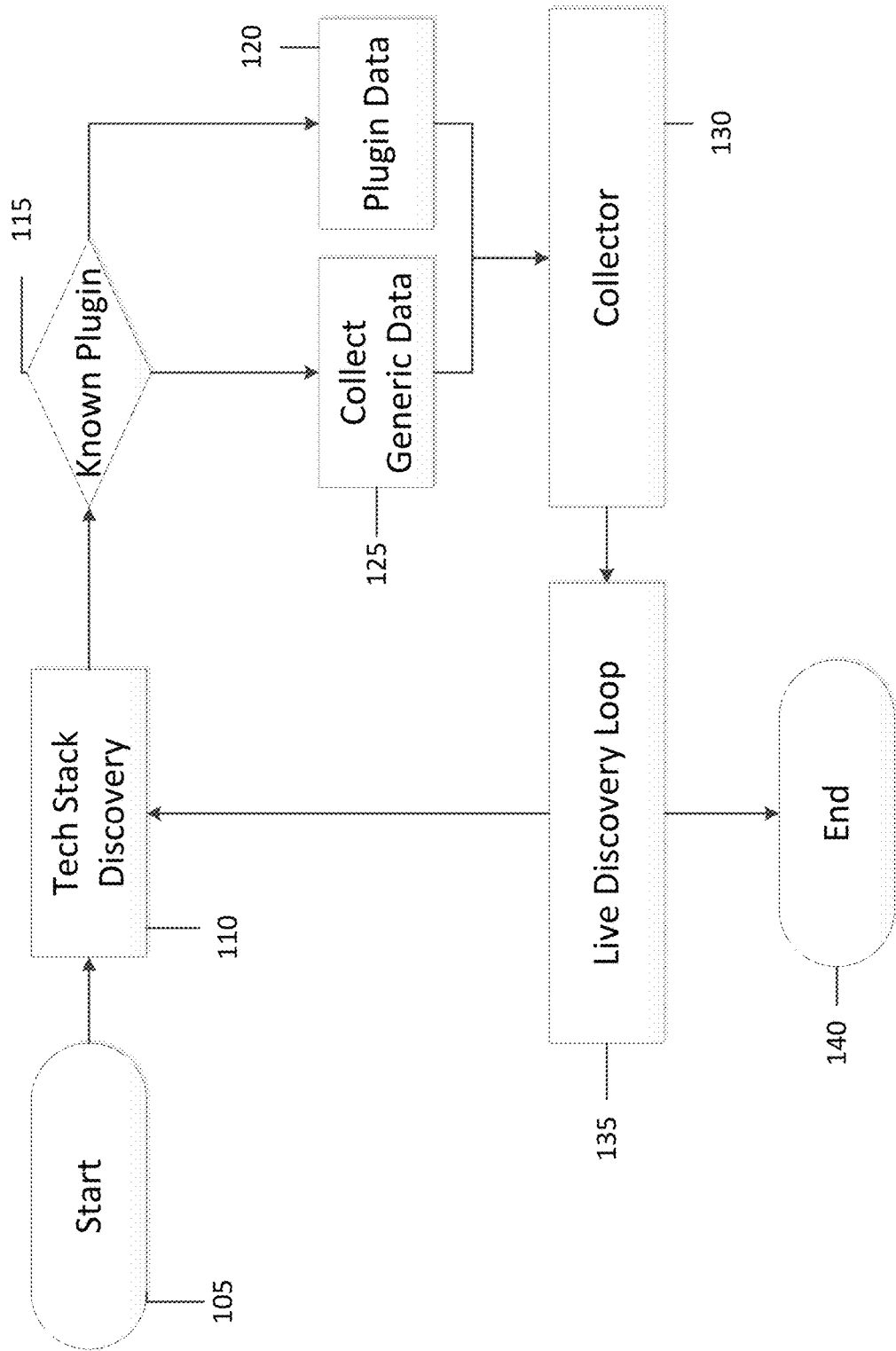
FIG. 1 is an exemplary flow diagram of a method for classifying data according to an exemplary embodiment of the present disclosure.

APM can utilize various agents to perform tasks in service of the APM, and on behalf of a server. Agents can vary in the tasks that are required between installation and viewing the data that they collect. Some tasks can be automatic and other tasks can be manual. APM can use agents to collect data on the monitored hosts. An APM agent can interact with one or more resources (e.g., a system or application), which can be on the on the same computer or virtual machine where the system or application is running. Some agents can track transactions between different resources. The agents on every monitored host can establish secure connections (e.g., HTTPS) with the APM server to pass the data therebetween. Data that is received by the agent can be encrypted and can be converted to a readable format (e.g., to be read by a database).

In most APM agent solutions, there are a number of plugins made for recognizing data from different sources. The agent is the source of APM data, so it has to categorize all input that it discovers. In plain agent solutions, the agent only returns data on items that it recognizes. In agents with auto discovery, they return a standard generalized piece of data on all sources, even if they do not have an explicit plugin to use to analyze or understand the data.

For example, an agent can have inputs from Java, Python, JavaScript, and MySQL. However, the agent may only have plugins for Java and MySQL. The agent can return a full set of data for Java and MySQL, and a basic standard set of data for Python and JavaScript calls. Information on the call stack, logs, active services on the hosted compute server, and a record of previous data to determine common call types that are undiscovered, can be used by the agent. The agent can store these common call types in the agent's collector database. A separate thread from the collector's server can take this marked data and label it with as much certainty as possible. For example, JavaScript calls from files ending in .js can be stored with label "js".

The exemplary system, method, and computer-accessible medium, according to an exemplary embodiment of the present disclosure, can utilize an agent to label and prioritize unmonitored call types based on categorization and frequency. This data can show a real time view of what technologies (e.g., data types) are not currently monitored. Since this data is time stamped, all users of the APM can see a historical trend of new technologies within their organizations over time. This can provide powerful inferences for predicting where technology is headed within the scope of the APM tool, as well as current agent monitoring plugin needs of the business. The APM and the agent can also be used to analyze various server metrics. Server metrics can include, but are not limited to, 1) Process % of total memory;
2) Process % of total CPU;
3) Process % of storage;
4) Process % of idle time;
5) System % of total memory;
6) System % of total CPU;
7) System % of storage; and/or
8) System % of idle time.

When data is received by the agent, it can be tagged or labeled as being a particular data type. The label can provide information for the agent to use to assign a plugin to the received data. For example, if the received data is related to Java, the agent can assign a Java plugin to the data to read and analyze the data. The APM and the server can have certain plugins already installed or available for use. For example, while there are numerous data types, the APM and the server can have plugins already installed for the most common data types. It can be possible for an APM and a server to have all known plugin types installed. However, each plugin type requires a certain amount of resources to be available. Also, each plugin type can require a manual provisioning of the server to have access to the plugin type. Thus, it is generally not feasible for an APM and a server to have ready access to all plugin types. Therefore, it can be possible that data is received by the agent and the server that may not be read by the server.

While certain received data may not be read by the server (e.g., since a plugin is not available), certain information about the data can be accessed. For example, certain standardized data can be accessed even if no plugin is available to read the data. If the incoming data is clearly tagged or labeled, then the APM and the server may easily determine the plugin needed to read the data, even if the plugin is not currently accessible by the server. In this exemplary scenario, this data can be stored in a collector and tagged as requiring a specific plugin. The server may then be provisioned with the necessary plugin to read such data. However, due to the resources needed to reprovision a server with a new plugin, the server may not be reprovisioned based on the receipt of a known data type until a sufficient amount of the data type has been received. For example, it may not be beneficial to reprovision a server with a new plugin for a known data type that has only been received once or a handful of times. However, after a certain number of times the known data has been received, the server may be reprovisioned with this new plugin.

While data received by the APM and the server may be specifically tagged or labeled such that the agent knows what type of data it is, and what type of plugin is needed, in many instances, the data received is not tagged or labeled. For example, depending on the author or generator of the data, the data may not include information that an agent or server can easily determine a data type. In such cases, the agent and/or the server can label the data as an unknown type (e.g., the agent and the server do not know what plugin to assign to the data). If this non-tagged unknown data is only received once or a handful of times, then such data may be stored as being an unknown type without further action taken on the data. However, in some exemplary embodiments of the present disclosure, it can be beneficial for the agent to attempt to classify the data as a particular data type. For example, the data may not be tagged, but the agent may still have access to a plugin that can read this non-tagged data. Thus, it would be beneficial for the data to be classified since the server can easily access the data once the data has been classified (e.g., an accessible plugin can be assigned to the data to reads the data). Additionally, if a certain amount of the untagged data has been received (e.g., a certain amount from the same source or a certain amount spread out across multiple sources), it can be beneficial for the server to be reprovisioned with a plugin to read the data.

In order to classify the non-tagged data an exemplary machine learning procedure/system can be used. Classification is a problem of identifying to which of a set of categories (sub-populations) a new observation belongs, on the basis of a training set of data containing observations, or instances, whose category membership is known. The exemplary machine learning system can be based on supervised learning. For example, the exemplary machine learning system can be trained using data that has been previously labeled as being a particular data type. This can be based on languages supported by the exemplary machine learning system. For example, the exemplary machine learning procedure can have support for multiple languages (e.g., it can infer that the non-tagged data is of a certain type based on the supported languages). This language support can be built into the machine learning system when the machine learning system is generated. Additionally, as new languages become available, or more widely used, the exemplary machine learning system can be modified to include these new languages. Thus, it may be possible that non-tagged data will be received, but that the machine learning system may not be able to classify the non-tagged data. Thus, this non-tagged data can be treated as generic data, and only certain information about the generic data may be determined.

For example, consider a scenario where there are 20 plugin types for different languages, and where the APM and the server have access to only 5 plugins related to 5 of the data types. The machine learning system more than likely will not have support for all of the available data types. Thus, in this case, there would be 15 plugins that are not installed (e.g., 15 plugins that are not accessible). When non-tagged data is received, the exemplary system, method, and computer-accessible medium can rule out the five sets that have an accessible plugin type. The exemplary machine learning system may also have some history (e.g., has encountered) of 10 of the other 20 languages, or the machine learning system is configured to try and identify an accuracy rating on these 10 languages. This, however, leaves 5 languages which do not have an accessible plugin, and for which the machine learning system cannot read and identify. In this case, the exemplary system, method, and computer-accessible medium may just store the non-identified data for future analysis by the exemplary machine learning system (e.g., after it has been updated), or a user can manually identify the data.

In order to classify non-tagged data, the exemplary machine learning system can utilize a nearest neighbor procedure. Nearest neighbor is a form of a proximity search, and optimizes a problem of finding the point in a given set that is closest (e.g., most similar) to a given point. Closeness is typically expressed in terms of a dissimilarity function: the less similar the objects, the larger the function values. The machine learning system can also utilize a neural map, or a neural network, to classify the non-tagged data. Multiple systems (e.g., machine learning systems) can be used that work in parallel to determine what the genericized (e.g., non-tagged) data is. For example, a neural net can be fed into a nearest neighbor solution to determine on a graph for what it is most likely to be the closest group. From these groups, the exemplary system, method, and computer-accessible medium can extract out what the language is, if there is any data that could provide a statistical inference.

For example, if the data has a particular term (e.g., file extension) in it. This may be sufficient to classify the data. Thus, all files having this term can have a particularly strong correlation. However, if there is not a particular label that is sufficient (e.g., above a certain threshold), this data may be manually tagged for the machine learning system. The machine learning system would then be able to classify this manually tagged data the next time the data is received. Additionally, it is possible that one machine learning system cannot classify the data, but that a second machine learning system can be used to classify the data. Thus, the exemplary machine learning system described herein can include multiple machine learning classification procedures.

The exemplary machine learning system can also utilize a natural language processing procedure to determine certain information about the data. For example, the exemplary system, method, and computer-accessible medium can analyze the structure of the incoming data (e.g., using a natural language processing procedure) to determine how the data is formed, and determine any metadata related to the data. This can be correlated and compared to other data types that may have been stored without classification.

In certain exemplary embodiments of the present disclosure, the exemplary system, method, and computer-accessible medium can be used to generate an inference about the received data. The exemplary system, method, and computer-accessible medium can apply the machine learning procedure to label the data with a particular accuracy. For example, the exemplary machine learning procedure can be used to provide a percentage accuracy for the data being a particular data type (e.g., 50% chance the data is Java data, 60% chance the data is java data, etc.). If the inference (e.g., percentage) is above a particular threshold, then the exemplary system, method, and computer-accessible medium can tag or label the data based on this inference. If the inference data type relates to a known and accessible plugin, then the accessible plugin can be applied to the inference data to confirm or deny the inference. Thus, rather than applying every accessible plugin to every non-tagged data that is received, accessible plugins may only be applied if an inference can be drawn about the non-tagged data. This can save significant time and resources, as it can be resource heavy to perform brute force for each non-tagged data by applying every accessible plugin type. Additionally, it may be possible that the plugin type for the non-tagged data is not accessible. Thus, a brute force method would expend significant resources without achieving any results.

In order for the exemplary system, method, and computer-accessible medium to draw a particular inference, a threshold can be assigned. Thus, unless the threshold is met or exceeded, no inference may be drawn. The threshold can be based on the amount of times similar non-tagged data has been received. For example, if data similar to the non-tagged data has been previously received, but not classified, then a higher threshold may be used when determining the data type. However, it may also be possible to manually adjust the threshold for similar types of data if, for example, the exemplary system, method, and computer-accessible medium has not been able to automatically determine the data type, but a user has manually classified the data type. For example, the threshold may be manually lowered for particular data types, while still being higher for other data types.

The inference drawn by the exemplary system, method, and computer-accessible medium may only be for the accessible plugin types. For example, the exemplary system, method, and computer-accessible medium can draw an inference if the threshold is above a certain percentage, and the inference relates to one of the plugins accessible by the server. If the inference does not relate to an accessible plugin, then the data may be stored and analyzed at a later data. Thus, the exemplary system, method, and computer-accessible medium can infer that the data is of a known type related to an accessible plugin, or not a known type. The non-tagged data that does not have an inference drawn about it can then be examined or analyzed at a later date to try to match to a known data type for which there currently is no plugin accessible by the server. Alternatively, the exemplary system, method, and computer-accessible medium can infer that the data is of a certain type even if the data is related to a non-accessible plugin. Thus, the data can be labeled as i) relating to a known and accessible plugin, ii) relating to a known, but inaccessible, plugin, or iii) relating to no known plugin. As another example, the exemplary system, method, and computer-accessible medium can draw an inference as to whether data has a relation to at least one programming language or whether the data has no relation to a known programming language. If a score assigned to the data is below a particular threshold, the data can be classified as having no relation to a known programming language.

FIG. 1 is an exemplary flow diagram of a method for classifying data according to an exemplary embodiment of the present disclosure. For example, the exemplary method can start at procedure 105. At procedure 110, a determination is made as to which plug-ins are accessible and which are not accessible. This may include a list of only accessible plugins as the number of inaccessible plugins may be too great to store or determine. Additionally a determination can be made as to whether there is actual live data being received. At procedure 115, a determination regarding the data is made as to whether the data is tagged or labeled, and whether the data relates to a known and accessible plugin type. If the data relates to a known and accessible plugin type, then the plugin can be applied at procedure 120, and the data can be stored in a collector at procedure 130 based on the known and accessible plugin.

The collector can include the APM and the agent, and can perform analytics on this information. For example, the collector can be used to show graphs of data and transactions and various information about applications being used. An application (e.g., a Java application) can connect to the collector that can push to an aged-based database, which can show billing transaction graphs, thread counts, and various other suitable types of data visualization. If the plugin type is known such that the data can be read, more analytics can be performed than if there is no known plugin type. The collector can also be used to determine whether the machine learning system described above should be utilized (e.g., based on whether a plugin type is known (e.g., the collector can initiate data classification procedure 135). Data classification procedure 135 can also be a part of, or included in, collector procedure 130.

If there is no known plugin at procedure 115, then at procedure 125, generic information regarding the data can be collected. The data can then be classified at procedure 135, as discussed in more detail below in FIG. 2. Before the data is classified at procedure 135, the data can be stored in a generic manner in the collector at procedure 130 and it can be stored in the collector and labeled as having no known plugin type. This information (e.g., the label) can be a temporary label, and can be updated depending on the results of the data classification procedure 135. For example, if the data is classified at procedure 135, then the data stored in the collector can be updated based on the classification. However, if data classification procedure 135 is unable to determine the data type, then the data temporarily labeled in the collector can be updated indicating that no classification has been determined. This data can be stored for future use and/or future classification.

As additional data is received, or as new plugins are loaded, the method can loop back to the tech stack discovery procedure 110, which can be updated with this new information. The process can then repeat to again determine if there is a known plugin type, based on the updated plugin information, or if data classification procedure 135 can now classify the date based on some update to the data classification procedure. At procedure 140, the method can end.

Figure 2:
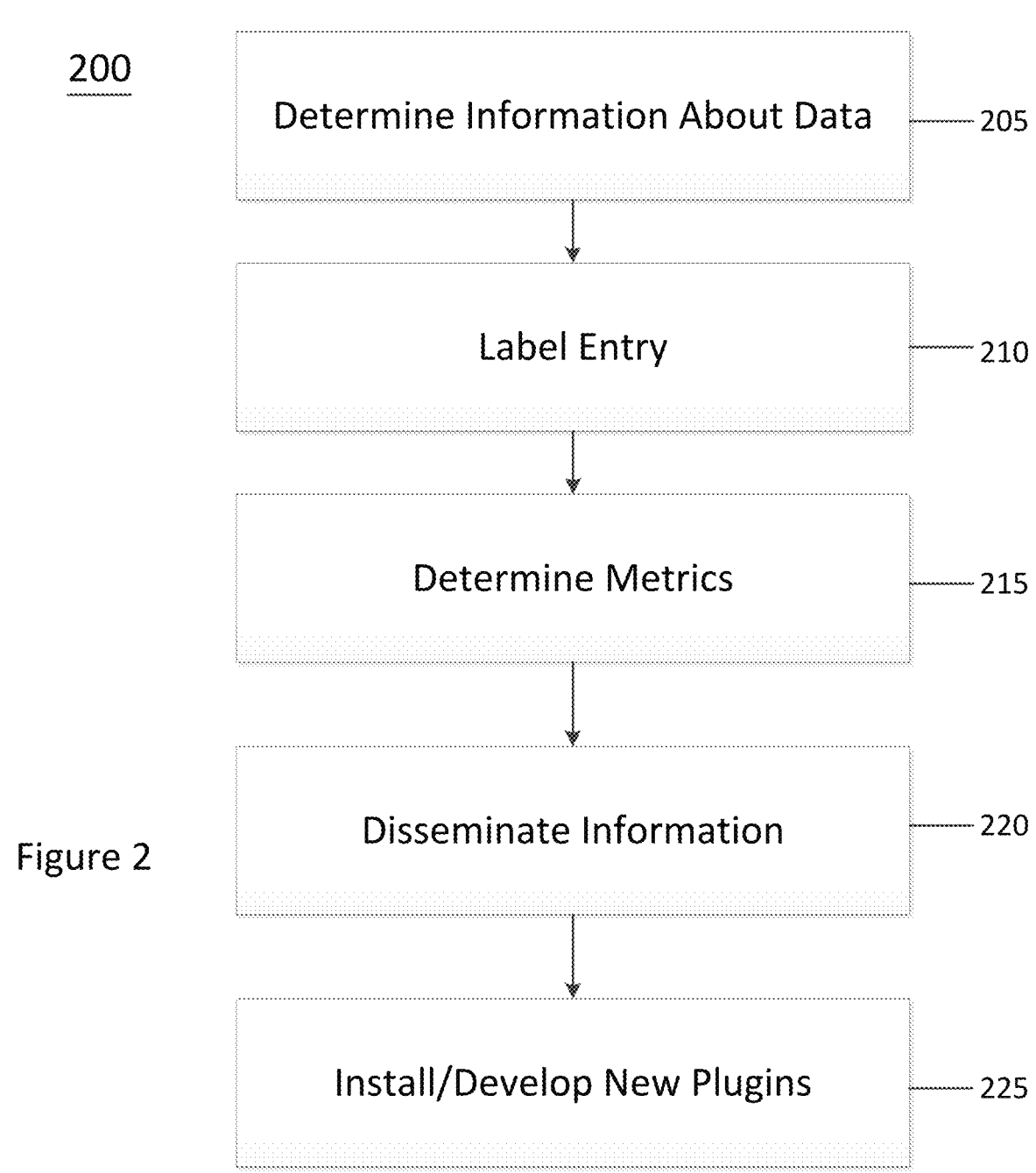
FIG. 2 is a flow diagram of the exemplary classification procedure shown in FIG. 1 according to an exemplary embodiment of the present disclosure.

FIG. 2 is a flow diagram of the exemplary classification procedure 135 shown in FIG. 1 according to an exemplary embodiment of the present disclosure. For example, at procedure 205, information about the data, which can be used to classify the data, can be determined. Information can include, but is not limited to, logs, transaction data, server metrics, time stamp, infrastructure data, any known systems (e.g., amazon web service tags), domain knowledge, and environment knowledge. All of this information can be used to correlate data for use by the exemplary machine learning system. At procedure 210, the machine learning system described above can use the determined data in order to generate an inference about the data. For example, as described above, a percentage accuracy of a particular data type can be given to (e.g., inferred about) the data. If an inference can be made about the data, then the data stored in the collector can be updated based on the inference. However, in certain exemplary embodiments of the present disclosure, the data may not be initially stored in the collector, and may only be stored in the collector based on the inference. For example, if an inference can be drawn about the data, it may then be stored in the collector and be associated with a particular data type based on the inference. If no inference is drawn, then the data may be stored in the collector indicating that no data type has been associated with the data.

At procedure 215, certain metrics or information can be determined based on the application of the machine learning system to the data (e.g., the inference drawn about the data), which can be disseminated at procedure 220. One or more inferences drawn about one or more sets of data can be combined to determine certain information about the flow of traffic to the server. For example, if a certain percentage (e.g., 70%) of traffic flowing to the server is of an unknown type, it would be beneficial to determine the unknown type and provide access to the associated plugin. Once the unknown data type is determined, certain actions can be taken. For example, if the unknown data type is determined to be an old programming language, policies can be put into place to upgrade this language. Alternatively, if it is of a new language, company resources can be put into this new language (e.g., hiring new people familiar with the programming language). This information can also be used to analyze trends over time such as how programming languages change over the course of 1 year or 5 years. Trends can be spotted earlier, which can facilitate a company to portion resources accordingly (e.g., be proactive instead of reactive). Additionally, the information can be used to install or develop new plugins at procedure 225 to read any data that has been determined to be of a known data type.

The metrics determined at procedure 215 can provide beneficial information to a large company. For example, in a large company (e.g., a company with thousands of products) it can be difficult to determine all the languages that are supported and how they are being used. It can also be difficult to determine what portions of those languages are being used. For example, it can be beneficial to determine what languages are still used by a company, and perform certain actions based on this information. For uncategorized data, it can be difficult to pick up on certain trends within a company (e.g., it can be hard to determine how the company's industry is changing). For example, a company may be pushing a new language like Go on its live servers, and it's associates are building code repositories for this language. However, in production it is determined that this new language is not actually being utilized, the exemplary system, method, and computer-accessible medium can provide valuable business insight into why this is happening, and whether Go is actually something that should continue to be invested in. Further, the exemplary system, method, and computer-accessible medium can be used to determine the languages that do not have plugins for and that are using a substantial amount of data. Thus, a company can provision resources within the company based on the data received by a server (e.g., which can be determined using the exemplary system, method, and computer-accessible medium).

Figure 3A:
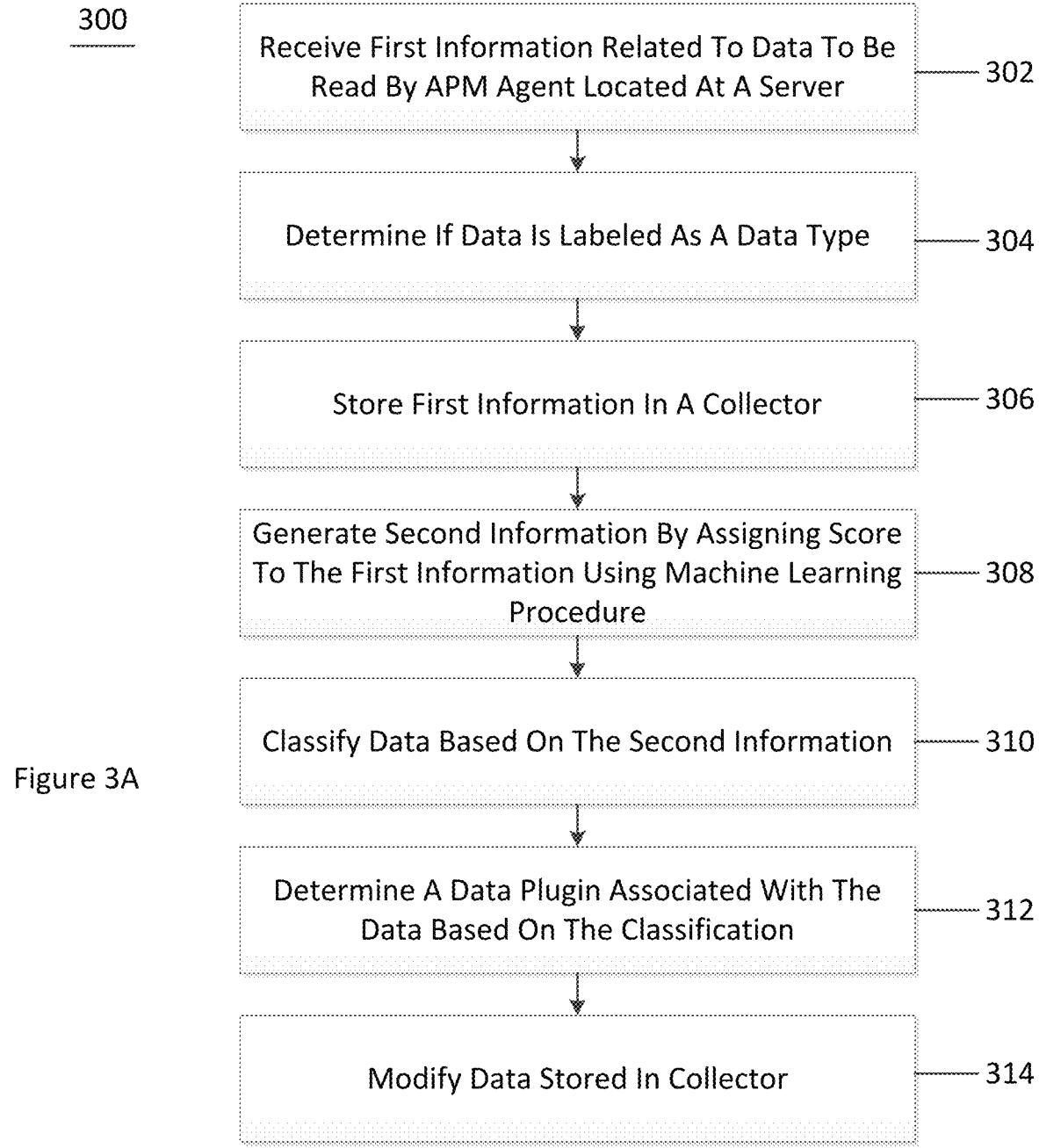
FIG. 3A is a flow diagram of a method for classifying data associated with an APM agent deployed on a server according to an exemplary embodiment of the present disclosure.

FIG. 3A is a flow diagram of a method 300 for classifying data associated with an APM agent deployed on a server according to an exemplary embodiment of the present disclosure. For example, at procedure 302, first information related to data to be read by a APM agent at a server can be received. At procedure 304, a determination can be made as to whether the data is labeled as a data type. At procedure 306, the first information can be stored in collector. At procedure 308, second information can be generated by assigning a score to the first information using a machine learning procedure. At procedure 310, the data can be classified based on the second information. At procedure 312, a data plugin associated with the data can be determined based on the classification. At procedure 314, the data stored in the collector can be modified based on the classification.

Figure 3B:
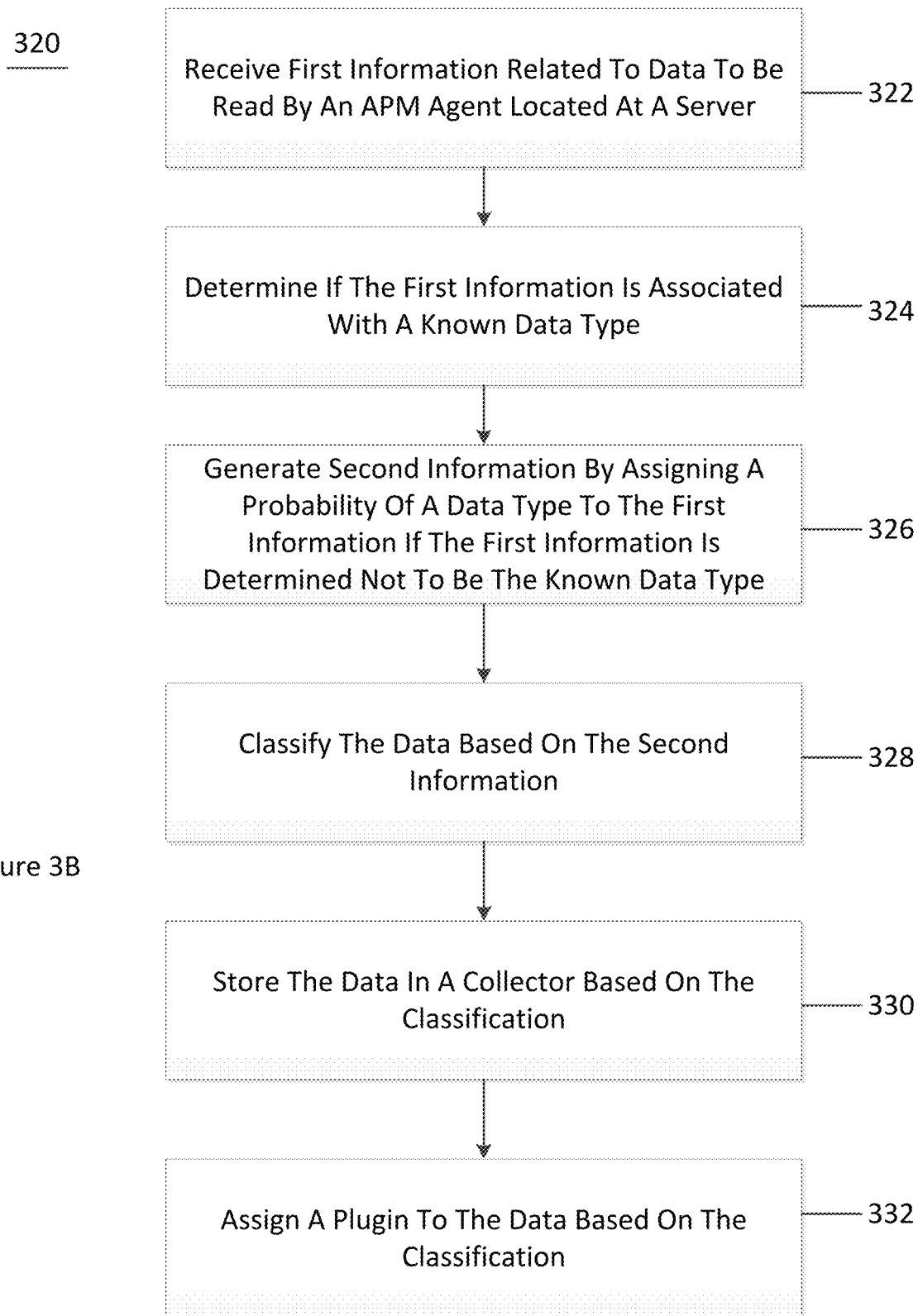
FIGS. 3B and 3C are flow diagrams of methods for storing data associated with an APM agent deployed on a server according to an exemplary embodiment of the present disclosure.

FIG. 3B is a flow diagram of a method 320 for storing data associated with an APM agent deployed on a server according to an exemplary embodiment of the present disclosure. For example, at procedure 322, first information related to data to be read by an APM agent located at a server can be received. At procedure 324, a determination can be made as to whether the first information is associated with a known data type. At procedure 326, second information can be generated by assigning a probability of a data type to the first information if the first information is determined not to be a known data type. At procedure 328, the data can be classified based on the second information. At procedure 330, the data can be stored in a collector based on the classification. At procedure 332, a plugin can be assigned based on the classification.

Figure 3C:
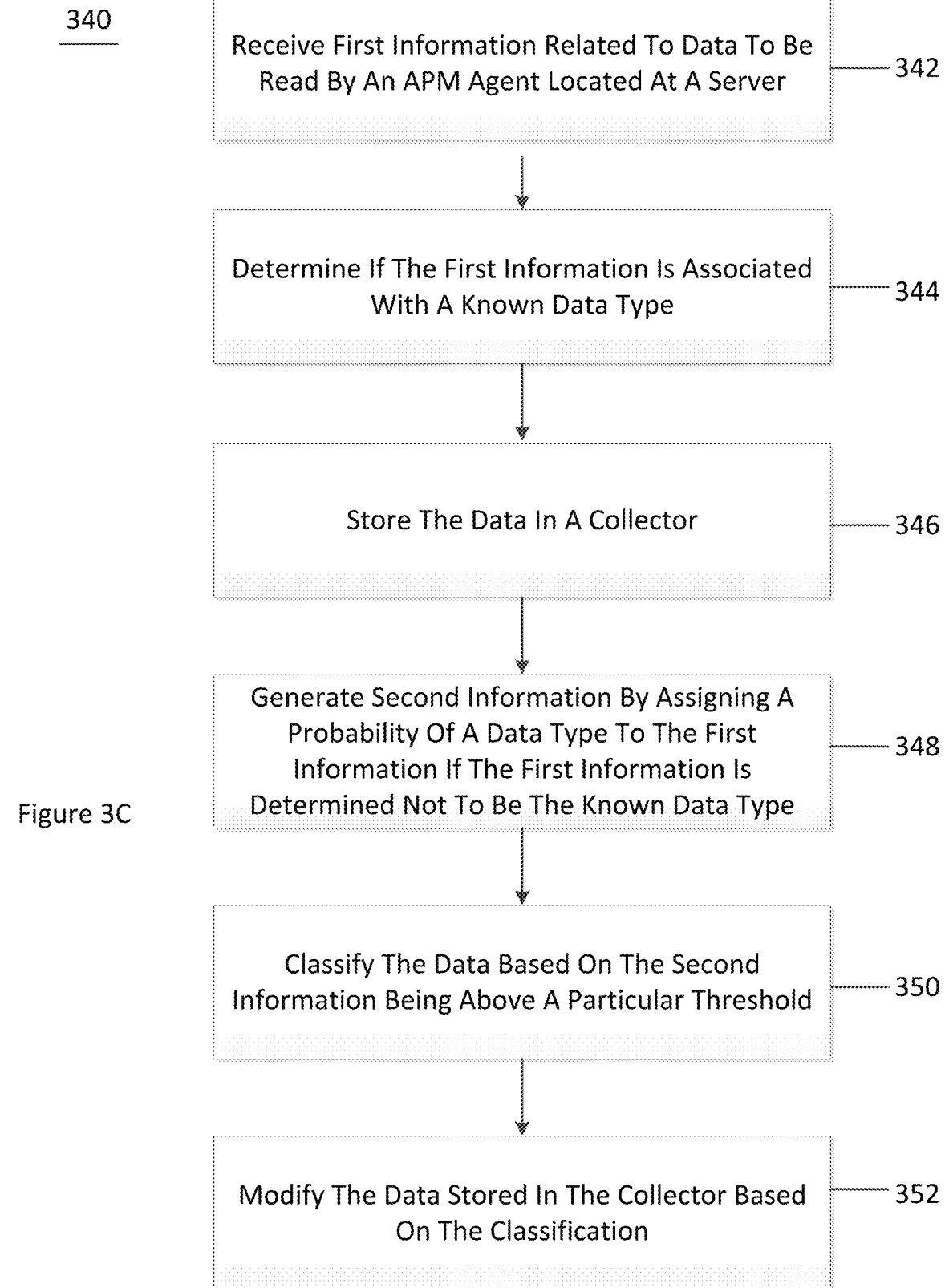

FIG. 3C is a flow diagram of a method 340 for storing data associated with an APM agent deployed on a server according to an exemplary embodiment of the present disclosure. For example, at procedure 342, first information related to data to be read by an APM agent located at a server can be received. At procedure 344, a determination can be made as to whether the data is associated with a known data type. At procedure 346, the data can be stored in a collector. At procedure 348, second information can be generated by assigning a probability of a data type to the first information if the first information is determined not to be a known data type. At procedure 350, the data can be classified if the second information is above a particular threshold. At procedure 352, the data stored in the collector can be modified based on the classification.

Figure 4:
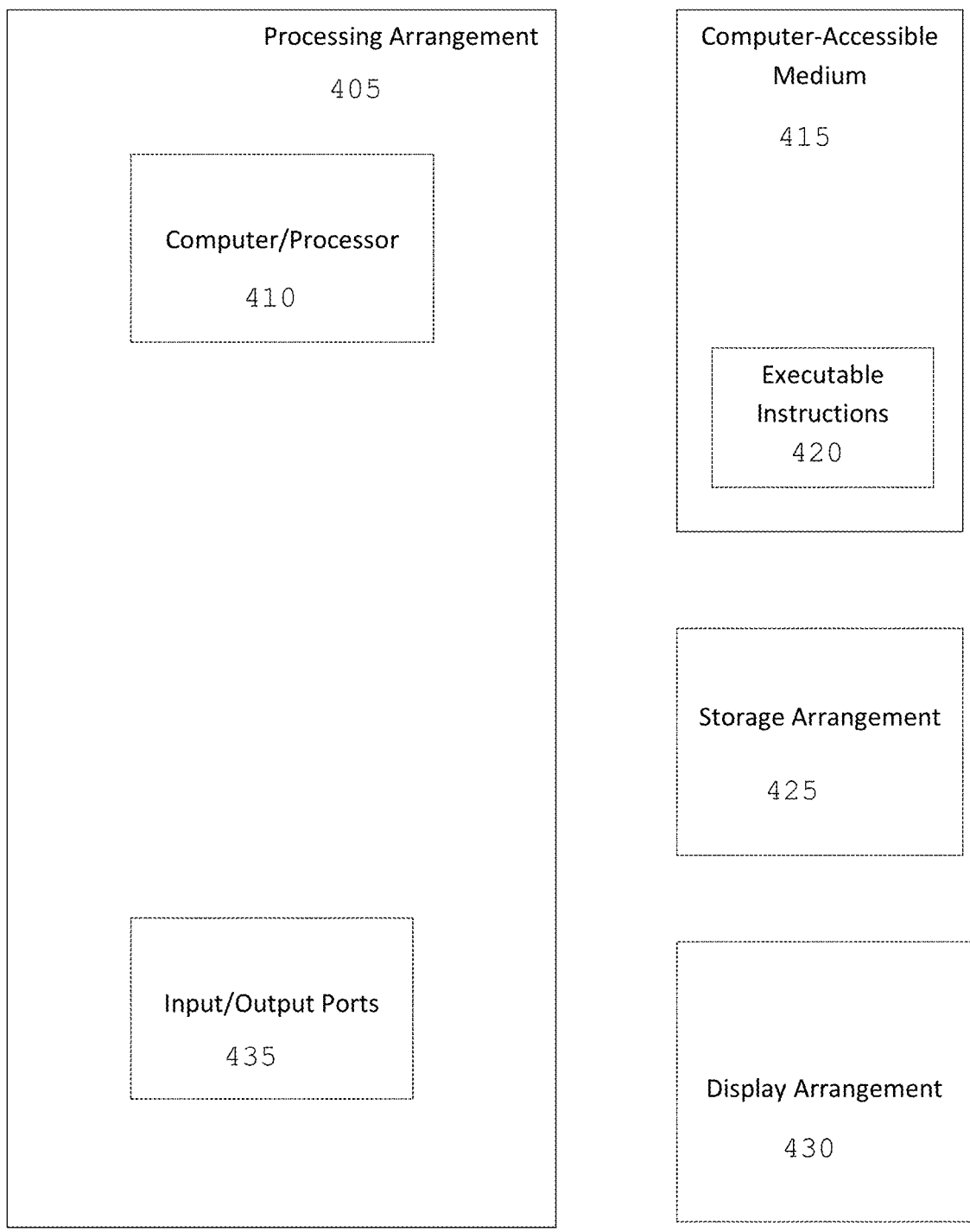
FIG. 4 is an illustration of an exemplary block diagram of an exemplary system in accordance with certain exemplary embodiments of the present disclosure.

FIG. 4 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 405. Such processing/computing arrangement 405 can be, for example entirely or a part of, or include, but not limited to, a computer/processor 410 that can include, for example one or more microprocessors, and use instructions stored on a computer-accessible medium (e.g., RAM, ROM, hard drive, or other storage device).

As shown in FIG. 4, for example a computer-accessible medium 415 (e.g., as described herein above, a storage device such as a hard disk, floppy disk, memory stick, CD-ROM, RAM, ROM, etc., or a collection thereof) can be provided (e.g., in communication with the processing arrangement 405). The computer-accessible medium 415 can contain executable instructions 420 thereon. In addition or alternatively, a storage arrangement 425 can be provided separately from the computer-accessible medium 415, which can provide the instructions to the processing arrangement 405 so as to configure the processing arrangement to execute certain exemplary procedures, processes, and methods, as described herein above, for example.

Further, the exemplary processing arrangement 405 can be provided with or include an input/output ports 435, which can include, for example a wired network, a wireless network, the internet, an intranet, a data collection probe, a sensor, etc. As shown in FIG. 4, the exemplary processing arrangement 405 can be in communication with an exemplary display arrangement 430, which, according to certain exemplary embodiments of the present disclosure, can be a touch-screen configured for inputting information to the processing arrangement in addition to outputting information from the processing arrangement, for example. Further, the exemplary display arrangement 430 and/or a storage arrangement 425 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for classifying data associated with at least one application performance management (APM) agent deployed on at least one server, wherein, when a computer arrangement executes the instructions, the computer arrangement is configured to perform procedures comprising:

receiving first information related to data to be read by the at least one APM agent located at the at least one server, the first information being information based on which the at least one APM agent or the at least one server determines whether the data is a data type;

generating second information by assigning a score to the first information using a neural network;

feeding the neural network into a nearest neighbor solution to determine a graph for a likely closest group;

receiving a tagging identification of a particular term within the first information;

classifying whether the data is the data type based on the second information based on the likely closest group and the tagging identification and;

determining at least one data plugin associated with the data based on the classification.

2. The computer-accessible medium of claim 1, wherein the computer arrangement is further configured to classify the data to be the data type when the score meets or exceeds a score threshold.

3. The computer-accessible medium of claim 1, wherein the computer arrangement is further configured to determine if the data is labeled as the data type prior to classifying the data.

4. The computer-accessible medium of claim 1, wherein the computer arrangement is configured to generate the second information based on the first information, the first information further including at least one of (i) at least one log associated with the data, (ii) transaction data associated with the data, (iii) server metrics associated with the data, (iv) at least one time stamp associated with the data, (v) infrastructure data associated with the data, (vi) domain knowledge, or (vii) environment knowledge.

5. The computer-accessible medium of claim 1, wherein the computer arrangement is further configured to generate the second information using at least one natural language processing procedure.

6. The computer-accessible medium of claim 1, wherein the computer arrangement is configured to classify the data as the data type if the score is above a particular threshold.

7. The computer-accessible medium of claim 1, wherein the score is a probability.

8. The computer-accessible medium of claim 1, wherein the computer arrangement is further configured to store the first information in a collector prior to generating the second information.

9. The computer-accessible medium of claim 8, wherein the computer arrangement is further configured to modify the data stored in the collector based on the classification.

10. The computer-accessible medium of claim 1, wherein the at least one server is a live server.

11. The computer-accessible medium of claim 1, wherein the computer arrangement is further configured to apply a temporary label to the data type prior to classifying the data.

12. The computer-accessible medium of claim 1, wherein the first information includes at least one of a file extension associated with the data, a structure of the data, or a metadata related to the data.

13. The computer-accessible medium of claim 12, wherein:
the first information includes a file extension associated with the data, and
the particular term includes the file extension.

14. The computer-accessible medium of claim 1, wherein:
the classification includes a programming language relation,
the data is assigned a relation to a known programming language if a score is above a programming language threshold,
the data is assigned no relation to a known programming language if a score is below the programming language threshold and
the programming language threshold is a percentage accuracy for the relation of the data to a known programming language.

15. A system for storing data associated with at least one application performance management (APM) agent deployed on at least one server, comprising:
a computer hardware arrangement configured to:
receive first information related to data to be read by the at least one APM agent located at the at least one server, the first information being information based on which the at least one APM agent or the at least one server determines whether the data is a data type;
determine if the first information is associated with at least one known data type;
generate second information by assigning a probability of at least one data type to the first information using a neural network if the first information is determined not to be the at least one known data type;
feeding the neural network into a nearest neighbor solution to determine a graph for a likely closest group;
receiving a tagging identification of a particular term within the first information;
classify the data based on the second information based on the likely closest group and the tagging identification; and
store the data in a collector based on the classification.

16. The system of claim 15, wherein the computer hardware arrangement is further configured to assign at least one data plugin to the data based on the classification.

17. The system of claim 15, wherein the computer hardware arrangement is configured to generate the second information based on at least one of (i) at least one log associated with the data, (ii) transaction data associated with the data, (iii) server metrics associated with the data, (iv) at least one time stamp associated with the data, (v) infrastructure data associated with the data, (vi) domain knowledge, or (vii) environment knowledge.

18. A method for storing data associated with at least one application performance management (APM) agent deployed on at least one server, comprising:
receiving first information related to data to be read by the at least one APM agent located at the at least one server, the first information being information based on which the at least one APM agent or the at least one server determines whether the data is a data type;
determining if the first information is associated with at least one known data type;
generating second information by assigning a probability of at least one data type to the first information using a neural network if the first information is determined not to be the at least one known data type;
feeding the neural network into a nearest neighbor solution to determine a graph for a likely closest group;
receiving a tagging identification of a particular term within the first information;
classifying the data based on the second information being above a particular threshold based on the likely closest group and the tagging identification
modifying the data based on the classification.

19. The method of claim 18, wherein the generating of the second information includes applying at least one machine learning procedure to the first information.

20. The method of claim 19, wherein the at least one machine learning procedure includes at least one convolutional neural network.

* * * * *